Patented Jan. 20, 1942

2,270,451

UNITED STATES PATENT OFFICE 2,270,451

STILBENE DYESTUFFS AND THEIR MANUFACTURE

Ernst Keller, Basel, Switzerland, assignor to the firm J. R. Geigy A. G., Basel, Switzerland No Drawing. Application June 12, 1940, Serial No. 340,177. In Switzerland July 3, 1939

15 Claims. (Cl. 260—143)

This invention relates to a process for the production of stilbene dyestuffs, whereby products with substantially improved properties of fastness can be produced.

It is well known to condense, if necessary under pressure, dinitrostilbene disulphonic acid, dinitrodibenzyl disulphonic acid or p-nitrotoluene sulphonic acid, in molecular or any suitable proportions, with aromatic amino compounds, especially monoaminoazo dyestuffs or mixtures of these dyestuffs. A subsequent treatment of the condensation products with metal yielding and/or oxidising media, leads to derivatives with improved fastness properties.

It has now been found that according to the above reaction, products with substantially improved properties of fastness are obtained by using wholly or partly in the above mentioned reaction, instead of the known aromatic amino compounds, aminoazobenzene compounds of the general formula:

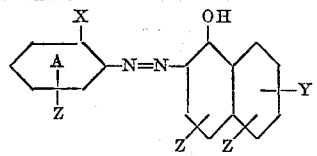

wherein X represents a hydroxyl, alkoxy or carboxyl group, or a substituent exchangeable for hydroxyl, Y represents a benzene nucleus substituted by an amino group and, if desired, still further substituted, which is linked with the naphthalene nucleus by a second N-atom or by the atom bridges

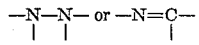

forming in o-position to the nucleus standing N-atom a hetero ring by means of a N-, S- or O-atom, and Z represents COOH, SO$_3$H or H, but at least once COOH or SO$_3$H, and wherein the benzene nucleus A may be further substituted.

The production of the aminoazodyestuffs according to the above formula is effected according to usual processes by coupling the diazobenzene compounds coming into question with the hydroxynaphthalene derivatives coming into question. As diazo components may be mentioned for example: 2-amino-1-hydroxybenzene-4-sulphonic acid, 4-chloro-2-amino-1-hydroxybenzene-6-sulphonic acid, 4-chloro-2-amino-1-hydroxybenzene-5-sulphonic acid, 6-chloro-2-amino-1-hydroxybenzene-4-sulphonic acid, 3-amino-2-hydroxy-5-sulphobenzoic acid, 2-amino-4-methoxybenzoic acid, 3-amino-4-methoxy- or 4-hydroxybenzoic acid, 4-nitro-2-amino-1-hydroxybenzene, 5-nitro-2-amino-1-hydroxybenzene, 4-chloro-2-amino-1-hydroxybenzene, 4-methyl-2-amino-1-hydroxybenzene, 4-chloro-6-nitro-2-amino-1-hydroxybenzene, 4-methyl-6-nitro-2-amino-1-hydroxybenzene, 4:6-dinitro-2-amino-1-hydroxybenzene (picramic acid), 5-nitro-2-aminoanisol, 1-amino-2-methoxy-5-methylbenzene, 2:5-dimethoxyaniline and so on. As coupling components may be cited for example: 3'-amino-C-phenyl-1:2-N-thiazolo-5-hydroxynaphthalene-7-sulphonic acid, 4'-amino-C-phenyl-1:2-N-thiazolo-5-hydroxynaphthalene-7-sulphonic acid, 3'-amino-C-phenyl-1:2-N-thiazolo-8-hydroxynaphthalene-6-sulphonic acid, 3'-amino-C-phenyl-2:1-N-thiazolo-8-hydroxynaphthalene-3:6-disulphonic acid (made according to the German Patent 165,126), 3'-amino-C-phenyl-(N)-2-oxazolo-5-hydroxynaphthalene-7-sulphonic acid, 3'-amino-C-phenyl-1:2(N)-imidazolo-5-hydroxynaphthalene-7-sulphonic acid, 4'-amino-phenyl-5-hydroxy-7-sulphonaphthyl-1:2-triazol, 3'-aminophenyl-8-hydroxy-3:6-disulphonaphthyl-1:2-triazol, 4'-aminophenyl-2-azimino-5-hydroxynaphthalene-7-sulphonic acid, 4'-aminophenyl-2-amino-5-hydroxynaphthalene-7-sulphonic acid, 6-benzidinohydroxynaphthalene-1-sulphonic acid-3; 6-(4-aminoanilino)-hydroxynaphthalene-1-sulphonic acid-3; 3'-amino-6'-methyl-5-hydroxy-7-sulphonaphthyl-1:2-triazol, 4'-amino-2'-chloro-5-hydroxy-7-sulphonaphthyl-1:2-triazol and so on.

The new metallised dyestuffs distinguish themselves from similar known dyestuffs, which are obtained by condensation under pressure of the aminoazodyestuffs from 4-chloro-2-amino-1-hydroxybenzene or 4-chloro-2-amino-1-hydroxybenzene-6-sulphonic acid and 2-amino-5-hydroxynaphthalene-7-sulphonic acid with dinitrostilbene-disulphonic acid and which are metallised before or after the condensation, in general by much better properties of fastness to acid, alkali or light or by a notable improvement of all the said fastness properties.

The following examples illustrate the invention, the parts being by weight:

Example 1

53.7 parts of the dyestuff produced by coupling diazotised 4-nitro-2-amino-1-hydroxybenzene with 3'-amino-C-phenyl-1:2-N-thiazolo-5-hydroxynaphthalene-7-sulphonic acid in a sodaalkaline solution in presence of pyridine are condensed for 12 hours at 100–105° C. under reflux with 47.4 parts of dinitrostilbene disulphonate of sodium in 250 parts of water and 50 parts of caustic soda lye of 36° Bé. After cooling the caustic soda lye is neutralised with hydrochloric acid, whereupon the dyestuff is completely precipitated with common salt and filtered off.

The moist filter cake of the dyestuff is mixed in 1600 parts of water at a weakly congo-acid reaction with 25 parts of crystallised coppersulphate which is dissolved in 100 parts of water, and the mixture is heated for 8 hours to 90° C. A sample must distinctly indicate a trace of copper excess in the outflow and this until the end thereof. The dyestuff is then salted out, filtered and one more precipitated from a sodaalkaline solution. It constitutes, when dried, a dark violet powder which dissolves in water with red-brown coloration and in concentrated sulphuric acid with violet coloration. The dyestuff dyes cotton of full, very light-fast brown shades.

If 107.4 parts of the above described aminoazo dyestuff are condensed for 12 hours at 100–105° C. with 47.4 parts of dinitrostilbene disulphonate of sodium in 500 parts of water and 100 parts of caustic soda lye of 36° Bé. and if the condensation product is coppered in a congoacid medium or, as described in Example 3, in an ammonia-alkaline solution, there is obtained a dyestuff which dissolves in water with bordeauxred coloration and in concentrated sulphuric acid with violet coloration and which dyes cotton of violet-brown shades of very good fastness to light.

*Example 2*

52.1 parts of the dyestuff produced by coupling diazotised 4 - nitro- 2- amino-1-hydroxybenzene with p-aminophenyl-5-hydroxy-7-sulphonaphthyl-1:2-triazol in a mimosa-alkaline solution in presence of pyridine are condensed for 18 hours under reflux at 100–105° C. with 47.4 parts of dinitrostilbene disulphonate of sodium in 330 parts of water and 70 parts of caustic soda lye of 36° Bé. and the whole is worked up as described in Example 1. The dyestuff constitutes, when dried, a dark, grey-violet powder; it dissolves in water with orange-brown coloration and in concentrated sulphuric acid with violet coloration and dyes cotton of yellow-brown shades. By after-treatment of the dyeings in the usual manner with copper-sulphate, a high improvement of the fastness to light and washing is obtained.

The dyestuff can, of course, also be converted in the usual manner in substance into the copper compound. The copper-containing dyestuff shows the same properties as the dyeings of the metal-free dyestuff after-treated with coppersalts.

*Example 3*

27.1 parts of the saponified dyestuff from m-aminobenzoic acid and o-methoxy-phenyl-aminomethyl-sulphonic acid and 52.7 parts of the dyestuff prepared by coupling diazotised 4-chloro-2-amino-1-hydroxybenzene with 3'-amino-C-phenyl -1:2 - N - thiazolo - 5 - hydroxy-naphthalene-7-sulphonic acid in a soda-alkaline solution in presence of pyridine are condensed for 10 hours according to usual method with 47.4 parts of dinitrostilbenedisulphonate of sodium in 600 parts of water and 80 parts of caustic soda lye of 36° Bé. and the whole is worked up as described in Example 1.

The moist filter cake is dissolved in 1200 parts of water at 80° C. and a solution produced from 25 parts of crystallised copper-sulphate in 100 parts of water and 50 parts of ammonia of 25% strength is added thereto. The whole is heated, while stirring, for 6 hours to 80–90° C. and the coppered dyestuff is precipitated out by means of common salt. It constitutes, when dried, a dark violet powder which dissolves in water with brown coloration and in concentrated sulphuric acid with navy-blue coloration and dyes cotton of brown shades of good fastness to light, alkali and acid.

*Example 4*

25.3 parts of the dyestuff from 2-amino-1-hydroxybenzene-4-sulphonic acid and 2:5-dimethoxy-aniline and 53.7 parts of the dyestuff 4-nitro-2-amino-1-hydroxybenzene-3'-amino-C-phenyl-1:2-N-thiazolo-5-hydroxynaphthalene-7-sulphonic acid are condensed for 18 hours in usual manner with 47.4 parts of dinitrostilbenedisulphonate of sodium in 600 parts of water and 80 parts of caustic soda lye of 36° Bé. The isolated condensation product is coppered for 12 hours in an ammonia-alkaline solution, as described in Example 3. The coppered dyestuff constitutes, when dried, a black powder, dissolves in water with dark violet coloration and in concentrated sulphuric acid with violet coloration and dyes cotton of grey shades of very high fastness to light.

By varying the proportion between the aminoazo-dyestuff and the dinitrostilbene disulphonic acid the shade of the dyestuffs can be influenced. If in the above example instead of 53.7 parts of the dyestuff 4-nitro-2-amino-1-hydroxybenzene→ 3'-amino-C-phenyl - 1:2 - N-thiazolo-5-hydroxynaphthalene-7-sulphonic acid, there are used under the same conditions for the condensation for instance 35 parts only of the said dyestuff, a dyestuff is obtained whose copper-compound yields in dyeing somewhat more greenish-grey shades.

The following table gives some further dyestuffs obtainable according to the present invention, whereby for sake of simplicity only the both limit-cases of the condensation, i. e. the condensation of one or two molecules of the aminoazo dyestuff with one molecule of dinitrostilbenedisulphonic acid are indicated.

Further dyestuffs may be produced according to the above examples by means of the components enumerated in the general part of the specification. They all possess in general the same or similar shades and tinctorial properties.

*Table*

| Aminoazo dyestuff | Molecular proportion of condensation between aminoazo dyestuff and dinitrostilbene disulphonic acid | Shade of the copper compound of the dyestuff on cotton |
|---|---|---|
| 4-nitro-2-amino-1-hydroxybenzene → 3'-amino-C-phenyl-1:2-N-thiazolo-8-hydroxynaphthalene-6-sulphonic acid. | 1:1<br>2:1 | Brown.<br>Violet-brown. |
| Picramic acid → 3'-amino-C-phenyl-1:2-N-thiazolo-8-hydroxynaphthalene-6-sulphonic acid. | 1:1<br>2:1 | Reddish-brown.<br>Do. |
| 4-nitro-2-amino-1-hydroxybenzene → 3'-amino-C-phenyl-1:2 (N) - imidazolo - 5 - hydroxynaphthalene-7-sulphonic acid. | 1:1<br>2:1 | Do.<br>Bordeaux. |
| 3-amino-4-methoxy-1-methylbenzene → 3'-amino-C-phenyl-1:2 - N - thiazolo - 5 - hydroxynaphthalene-7-sulphonic acid. | 1:1<br>2:1 | Brown.<br>Dark-brown. |
| 2-amino-1-hydroxybenzene-4-sulphonic acid → 3'-amino-C-phenyl-1:2-N-thiazolo-5-hydroxynaphthalene-7-sulphonic acid. | 1:1<br>2:1 | Yellow-brown.<br>Reddish-brown. |
| Dehydrothio - p - toluidino - sulphonic acid and 4-chloro-2-amino-1-hydroxy-benzene → 3'-amino-C-phenyl-1:2 - N - thiazolo - 5 - hydroxynaphthalene-7-sulphonic acid. | Each time 1:1 | Brown-olive. |
| Sulphanilic acid → o-methoxyphenylaminomethylsulphonic acid saponified and 4 - nitro - 2 - amino - 1 - hydroxybenzene → 3'-amino-C-phenyl-1:2-N-thiazolo-8-hydroxynaphthalene-6-sulphonic acid | Each time 1:1 | Red-brown. |
| Sulphanilic acid → 1-amino-2:5-dimethylbenzene and 4 - nitro - 2 - amino - 1 - hydroxybenzene → 3'-amino-C-phenyl-1:2-N-thiazolo-5-hydroxynaphthalene-7-sulphonic acid. | Each time 1:1 | Brown. |
| 2-chloraniline-5-sulphonic acid → 2:5-dimethoxyaniline and 4 - nitro - 2 - amino - 1 - hydroxybenzene → 3'-amino-C-phenyl-1:2-N-thiazolo-5-hydroxynaphthalene-7-sulphonic acid | Each time 1:1 | Brown. |

What I claim is:
1. In the manufacture of stilbene dyestuffs by condensation of dinitrostilbene disulphonic acid, dinitrodibenzyl disulphonic acid or p-nitrotoluenesulphonic acid with aromatic compounds which contain free amino groups in any proportion, in presence of caustic alkalies, with or without the application of pressure, and if desired subsequent treatment of the products with metal yielding and/or oxidising agents, the improvement wherein instead of the known aromatic amino compounds there are used on one molecule of dinitrostilbene disulphonic acid, dinitrodibenzyl disulphonic acid and equimolecular parts of p-nitrotoluene sulphonic acid from substantially one to two molecules of aminoazobenzene dyestuffs of the general formula:

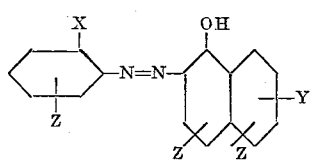

wherein X represents one member of the group consisting of hydroxyl, alkoxy, carboxyl and halogen, Y represents a benzene nucleus substituted by an amino group and linked to the naphthalene nucleus by a member of the group consisting of

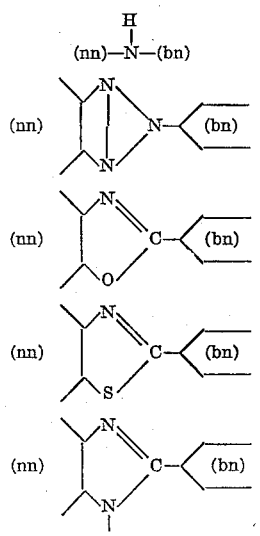

(nn) meaning "naphthalene nucleus" and (bn) meaning "benzene nucleus", and Z represents one member of the group consisting of COOH, SO3H and H, but at least once one of the members COOH and SO3H.

2. In the manufacture of stilbene dyestuffs by condensation of dinitrostilbene disulphonic acid, dinitrodibenzyl disulphonic acid or p-nitrotoluenesulphonic acid with aromatic compounds which contain free amino groups in any proportion, in presence of caustic alkalies, with or without the application of pressure, and if desired subsequent treatment of the products with metal yielding and/or oxidising agents, the improvement wherein instead of the known aromatic compounds there are used on one molecule of dinitrostilbene disulphonic acid, dinitrodibenzyl disulphonic acid and equimolecular parts of p-nitrotoluene sulphonic acid from substantially one to two molecules of aminoazobenzene dyestuffs of the general formula:

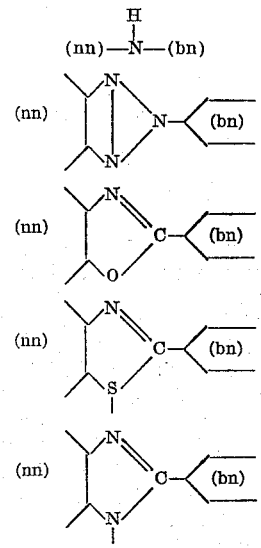

wherein X represents one member of the group consisting of hydroxyl, alkoxy, carboxyl and halogen, Y represents a benzene nucleus, substituted by an amino group and linked to the naphthalene nucleus by a member of the group consisting of (nn) meaning "naphthalene nucleus" and (bn) meaning "benzene nucleus", Z represents one member of the group consisting of COOH, SO3H and H, but at least once one of the members COOH and SO3H, and W represents one member of the group consisting of H, CH3 and OCH3.

3. In the manufacture of stilbene dyestuffs by condensation of dinitrostilbene disulphonic acid, dinitrodibenzyl disulphonic acid or p-nitrotoluenesulphonic acid with aromatic compounds which contain free amino groups in any proportion, in presence of caustic alkalies, with or without the application of pressure, and if desired subsequent treatment of the products with metal yielding and/or oxidising agents, the improvement wherein instead of the known aromatic amino compounds there are used on one molecule of dinitrostilbene disulphonic acid, dinitrodibenzyl disulphonic acid and equimolecular parts of p-nitrotoluene sulphonic acid from substantially one to two molecules of aminoazobenzene dyestuffs of the general formula:

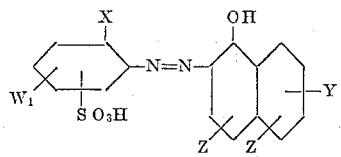

wherein X represents one member of the group consisting of hydroxyl, alkoxy, carboxyl and halogen, Y represents a benzene nucleus substituted by an amino group and linked to the naphthalene nucleus by a member of the group consisting of

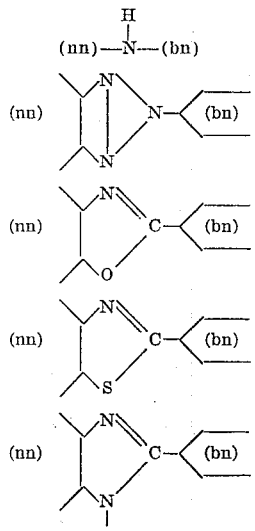

(nn) meaning "naphthalene nucleus" and (bn) meaning "benzene nucleus", Z represents one member of the group consisting of COOH, SO₃H and H, but at least once one of the members COOH and SO₃H, and W₁ represents one member of the group consisting of H, NO₂ and Cl.

4. In the manufacture of stilbene dyestuffs the step of condensing the coupling product of diazotised 4-nitro-2-amino-1-hydroxybenzene and 3'-amino-C-phenyl-1:2-N-thiazolo-5-hydroxynaphthalene-7-sulphonic acid with dinitrostilbene-disulphonate of sodium.

5. In the manufacture of stilbene dyestuffs the step of condensing the coupling product of diazotised 4-nitro-2-amino-1-hydroxybenzene and 3'-amino-C-phenyl-1:2-N-thiazolo-5-hydroxynaphthalene-7-sulphonic acid with dinitrostilbene-disulphonate of sodium and subsequently coppering the thus obtained dyestuff.

6. In the manufacture of stilbene dyestuffs the step of condensing the coupling product of diazotised 4-nitro-2-amino-1-hydroxybenzene and p-amino-phenyl-5-hydroxy-7-sulphonaphthyl-1:2-triazol with dinitrostilbenedisulphonate of sodium.

7. In the manufacture of stilbene dyestuffs the step of condensing the coupling product of diazotised 4-nitro-2-amino-1-hydroxybenzene and p-amino-phenyl-5-hydroxy-7-sulphonaphthyl-1:2-triazol with dinitrostilbenedisulphonate of sodium and subsequently coppering the thus obtained dyestuff.

8. In the manufacture of stilbene dyestuffs the step of condensing the coupling product of 2-amino-1-hydroxybenzene-4-sulphonic acid and the dyestuff from 4-nitro-2-amino-1-hydroxybenzene and 3'-amino-C-phenyl-1:2-N-thiazolo-5-hydroxynaphthalene-7-sulphonic acid, with dinitrostilbene-disulphonate of sodium.

9. In the manufacture of stilbene dyestuffs the step of condensing the coupling product of 2-amino-1-hydroxybenzene-4-sulphonic acid and the dyestuff from 4-nitro-2-amino-1-hydroxybenzene and 3'-amino-C-phenyl-1:2-N-thiazolo-5-hydroxynaphthalene-7-sulphonic acid, with dinitrostilbene-disulphonate of sodium and subsequently coppering the thus obtained dyestuff.

10. The new stilbene dyestuffs from the condensation with dinitrostilbene disulphonic acid of an aminoazobenzene dyestuff of the general formula:

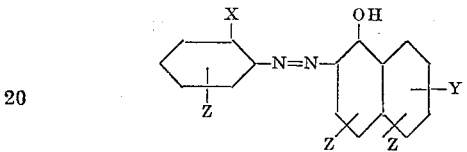

wherein X represents one member of the group consisting of hydroxyl, alkoxy, carboxyl and halogen, Y represents a benzene nucleus substituted by an amino group and linked to the naphthalene nucleus by a member of the group consisting of

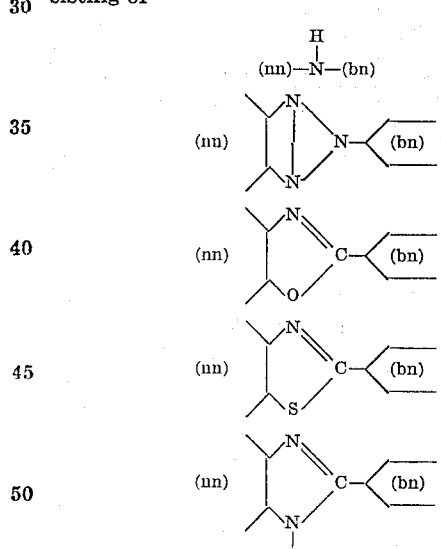

(nn) meaning "naphthalene nucleus" and (bn) meaning "benzene nucleus," and Z represents one member of the group consisting of COOH, SO₃H and H, but at least once one of the members COOH and SO₃H.

11. The new stilbene dyestuffs from the condensation with dinitrostilbene disulphonic acid of an aminoazobenzene dyestuff of the general formula:

wherein X represents one member of the group consisting of hydroxyl, alkoxy, carboxyl and halogen, Y represents a benzene nucleus substituted by an amino group and linked to the naphthalene nucleus by a member of the group consisting of

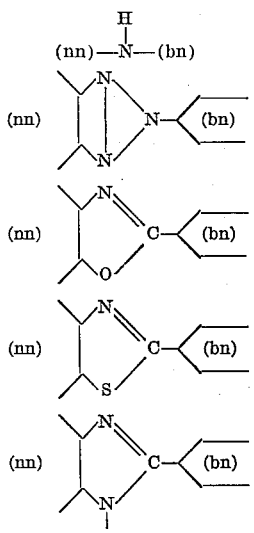

(nn) meaning "naphthalene nucleus" and (bn) meaning "benzene nucleus," Z represents one member of the group consisting of COOH, SO₃H and H, but at least once one of the members COOH and SO₃H, and W represents one member of the group consisting of H, CH₃ and OCH₃.

12. The new stilbene dyestuffs from the condensation with dinitrostilbene disulphonic acid of an aminoazobenzene dyestuff of the general formula:

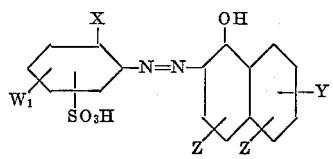

wherein X represents one member of the group consisting of hydroxyl, alkoxy, carboxyl and halogen, Y represents a benzene nucleus substituted by an amino group and linked to the naphthalene nucleus by a member of the group consisting of

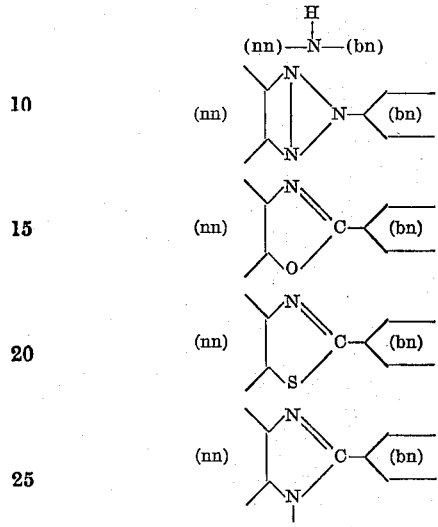

(nn) meaning "naphthalene nucleus" and (bn) meaning "benzene nucleus," Z represents one member of the group consisting of COOH, SO₃H and H, but at least once one of the members COOH and SO₃H, and $W_1$ represents one member of the group consisting of H, NO₂ and Cl.

13. The new stilbene dyestuff as condensation product obtained according to claim 4.

14. The new stilbene dyestuff as condensation product obtained according to claim 6.

15. The new stilbene dyestuff as condensation product obtained according to claim 8.

ERNST KELLER.